March 8, 1966 G. F. AROYAN 3,239,674
RADIANT ENERGY RECEIVING AND DETECTION SYSTEMS
Filed Feb. 2, 1960 7 Sheets-Sheet 1

GEORGE F. AROYAN
INVENTOR.

BY
ATTORNEYS

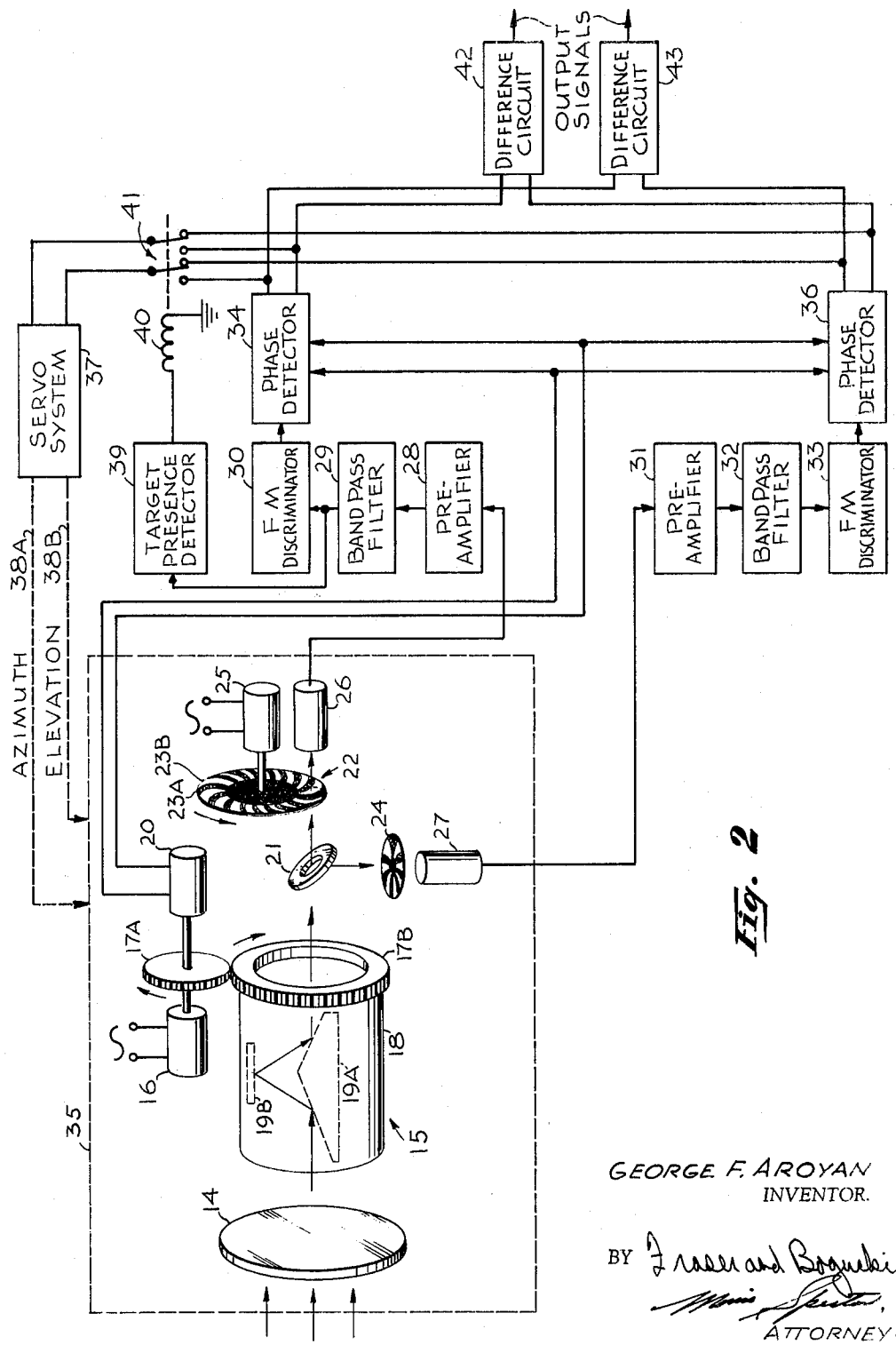

March 8, 1966 G. F. AROYAN 3,239,674
RADIANT ENERGY RECEIVING AND DETECTION SYSTEMS
Filed Feb. 2, 1960 7 Sheets-Sheet 3

GEORGE F. AROYAN
INVENTOR.

BY Fraser and Bogucki

ATTORNEYS

March 8, 1966 — G. F. AROYAN — 3,239,674
RADIANT ENERGY RECEIVING AND DETECTION SYSTEMS
Filed Feb. 2, 1960 — 7 Sheets-Sheet 4

GEORGE F. AROYAN
INVENTOR.

March 8, 1966  G. F. AROYAN  3,239,674
RADIANT ENERGY RECEIVING AND DETECTION SYSTEMS
Filed Feb. 2, 1960  7 Sheets-Sheet 5

GEORGE F. AROYAN
INVENTOR.

BY Fraser and Bogucki
Morris Liston
ATTORNEYS

GEORGE F. AROYAN
INVENTOR.

United States Patent Office 3,239,674
Patented Mar. 8, 1966

3,239,674
RADIANT ENERGY RECEIVING AND
DETECTION SYSTEMS
George F. Aroyan, Woodland Hills, Calif., assignor to
Thompson Ramo Wooldridge Inc., Canoga Park, Calif.,
a corporation of Ohio
Filed Feb. 2, 1960, Ser. No. 6,320
24 Claims. (Cl. 250—203)

This invention relates to systems for receiving and detecting radiant energy and more particularly to a new and improved radiation receiving and detection system in which separate electrical signals are generated in response to received radiation from at least two sources.

In radiation receiving systems, it is well known that the radiation from an object may be collected and an electrical signal corresponding to the intensity of the received radiation may be generated by some suitable transducer. Although the novel apparatus of the present invention finds particularly useful application in systems responsive to electromagnetic radiation falling within the spectrum of infrared or visible light, the novel features of the present invention are also of advantage in systems operating in response to other forms of radiant energy, including both visible and invisible light rays, infrared energy, and radio frequency waves. Accordingly, the term "optical," often employed as descriptive of visible light processing systems, will, as used herein, be construed as being also descriptive of systems for collecting, directing, refracting, transducing, and detecting all forms of radiant energy including that constituting visible light. Furthermore, it will be understood that the description of the principles of the present invention as given below in terms of a specific form of radiant energy, such as visible light, is by way of example only and that the invention may be applied as well to systems responsive to other forms of radiant energy.

In most prior art radiation detection systems employed for detecting and determining the position and movement of a target with respect to a given point of observation, the space in which a target may be present is systematically examined by an electro-optical system which collects radiation from a predetermined field of view. Such an electro-optical system generally employs combinations of optical elements such as mirrors and lenses and is designed to be responsive on a selective basis to only that energy which is collected within the predetermined field of view. The response pattern of such a system is generally representable as a solid cone extending into space, with the apex of the cone being positioned at the point of observation. The predetermined field of view, or response pattern, is generally referred to as the "instantaneous field of view" or sometimes "field of view" of the collection apparatus. The optical axis of the system, as projected into space, is, in most cases, centrally disposed within the instantaneous field of view so that the optical axis of the system is in geometric coincidence with the axis of the conical response pattern of the apparatus.

The energy collected within the instantaneous field of view of the above-described electro-optical system may be directed to an energy-sensitive cell which develops an electrical output signal representing the intensity of the radiant energy collected within the field of view. In accordance with prior art techniques, it is common to find that a circular disc-like chopping reticle is positioned within the electro-optical system at an image or focal plane. Such a reticle is rotated about its axis in interrupting relation to the radiation collected by the system so as to "chop" the radiation as it is directed to the sensitive cell. This type of reticle, also known as an episcotister, is generally called a "chopping" reticle because it is comprised of a pattern of carefully dimensioned alternate areas of relative opacity and transmissivity to the energy or radiation collected by the system. The shape of each of these areas often conforms to that of a sector of a circle. The areas of relative transmissivity defined between adjacent areas of relative opacity on the reticle pattern are sometimes called "reticle apertures" because it is through these openings, or apertures, that radiant energy is permitted to reach the energy-sensitive cell. As the reticle is rotated at a selected angular velocity, the reticle apertures move within the focal plane and modulate the energy reaching the energy-sensitive cell. As a consequence, the cell produces an output signal including alternating current components having a frequency proportional to both the number of reticle apertures and the rotational velocity of the reticle.

In general, the detection of the presence of a radiant energy emitting source within the field of view is sensed during a search mode of operation, and once the presence of such an object has been established, a track mode of operation takes place in which the radiation-emitting source is maintained within the field of view. During the search mode of operation, the entire electro-optical system may be mechanically driven to execute a systematic scanning action which results in the exploratory examination of a volume of space many times greater than the instantaneous field of view. Upon the sensing of the presence of a radiant energy emitting source or target within the field of view, the electro-optical system may be switched to a track mode of operation in which electrical signals derived from the radiation-sensitive cell are employed to control a servo system by means of which the electro-optical system is maintained in alignment with the radiation-emitting source and corrective signals are applied to the servo system so that the electro-optical system as a whole follows the selected source or target as it moves through space. The tracking mode of operation is achieved in most prior art radiation receiving systems through the generation of a frequency modulated signal at the output of the radiation-sensitive cell. The frequency modulated signal is generated by virtue of the fact that the object in space is imaged in a focal plane at the rotating reticle and by causing the image of the object to move in a circular path within the focal plane, or, in the alternative, by causing the rotational axis of the reticle to revolve around the image in the focal plane, the radiation from the object is chopped or modulated in passing through the reticle at a variable rate. As a result, a component of the radiation-sensitive cell's output signal is frequency modulated. By comparing the phase of the frequency modulation with a reference signal, the angular coordinate of the target or source in a set of reference polar coordinates may be ascertained. Similarly, the magnitude of the frequency deviation is a measure of the polar radius in the same set of coordinates. From this information, the servo control system may be brought into action to track or follow any motion of the source or target through space.

In order to ascertain the azimuth and elevation coordinates of the target or source relative to the earth, conventional systems employ electrical signal generating transducers which are linked to the electro-optical system for measuring the mechanical position of the optical axis with respect to a fixed base or foundation. The accuracy of measurement in known systems has been limited by the amount of backlash and twist or strain in the mechanical portions of the system as well as the accuracy of the transducers employed in translating a mechanical position into an electrical signal. Furthermore, a precise mechanical positioning of the instrument is required to determine the exact coordinates of the object in space. Thus, the translation of the mechanical position of the system into an electrical signal has been imperfect due to the existence of backlash and mechanical inaccuracy, with the result that measurements made with known types of systems have been inadequate. In order to get reasonable accuracy, the output signals had to be smoothed or averaged for long periods of time in order to minimize the effects of the mechanical inaccuracies. Even where the electrical signals were averaged, many prior art systems have been unable to determine the coordinates of a radiation source with accuracies greater than to within six to ten seconds of arc.

An additional difficulty encountered in known prior art electro-optical radiation detection systems arises when more than one source of radiation falls within the field of view at a given time. Known systems have been unable to distinguish between the separate sources, thereby leading to erroneous output signals falsely indicating the coordinates of a source of interest. Only through a lowering of the sensitivity of the system has the effect of a secondary radiation source been eliminated and this, of course, at the expense of losing information which might otherwise be derived from the secondary radiation source.

Accordingly, it is the principal object of the present invention to provide a new and improved electro-optical radiation receiving system which, inter alia, overcomes the aforesaid disadvantages of previously known systems.

It is an additional object of the present invention to provide a new and improved electro-optical radiation receiving system in which output signals are derived directly from the system by means of which the coordinates of a selected radiation source may be determined.

It is still another object of the present invention to provide a new and improved electro-optical radiation receiving system in which the angular separations of two separate radiation emitting sources may be determined with respect to one another.

It is yet another object of the present invention to provide a new and improved electro-optical radiation receiving system in which the motion of a selected radiation source may be detected, measured, and followed with reference to one or more other radiation sources.

It is yet another object of the present invention to provide a new and improved electro-optical radiation receiving system which is capable of distinguishing between sources emitting radiation falling within a given field of view.

Briefly, in accordance with one aspect of the present invention, an electro-optical radiation receiving system is provided in which electrical signals are generated representing at least two radiation emitting sources falling within a predetermined field of view. Through a comparison of the electrical signals, the coordinates and movement of one of the sources with respect to the others of the sources are determined. In one particular embodiment of the invention, the field of view is divided into two portions, with a separate electrical signal being generated for radiation received in each portion. One of the electrical signals is employed to control a servo system which brings the electro-optical radiation receiving system into optical alignment with a selected one of the two sources falling within a first portion of the field of view. Electrical signals representing a radiation emitting source falling within the second portion of the field of view are employed in conjunction with the electrical signals representing the source falling within the first portion of the field of view to ascertain the relative coordinates of the two sources with respect to one another.

In accordance with a further aspect of the present invention, an electro-optical radiation receiving system is provided in which a field of view is divided into a centrally disposed portion axially aligned with the optical axis of the system and a peripheral portion concentrically surrounding the centrally disposed portion. A first frequency modulated electrical signal is generated corresponding to received radiation falling within the centrally disposed portion, and a second frequency modulated electrical signal is generated corresponding to received radiation falling within the peripheral portion of the field of view. A target-sensing circuit may be connected to the second electrical signal generating means for detecting the presence of a target within the peripheral field of view. By means of a servo system, the electro-optical system may be moved in response to a signal from the target-sensing means to bring the optical system into alignment with the target so that the target radiation is received by the system within the centrally disposed portion of the field of view. In response to the first frequency modulated signal corresponding to received radiation within the first field of view, a servo system may be driven to track the selected target, and through a comparison of the first and second frequency modulated signals derived from the system the coordinates of the target with respect to a reference source of radiation falling within the peripheral field of view may be ascertained. The reference source of radiation may comprise a star whose coordinates in space are known so that through the comparison of the signals the coordinates of the selected target relative to the star are determined. Thus, electrical signals are derived from the system directly representing the coordinates of the selected target with respect to the reference star without the introduction of any mechanical inaccuracies produced by the mechanical portions of the positioning system and without the necessity for precisely locating the electro-optical system as a whole on a fixed foundation or base.

In accordance with a still further aspect of the present invention, separate electrical signals are derived corresponding to received radiation from each of a plurality of radiation emitting sources, and the signals are compared to sense and measure any relative movement between the sources in space. By a comparison of a signal attributable to a moving source with signals attributable to fixed sources, such as stars, output signals may be derived from the system directly representing the direction, extent, and velocity of motion of the moving source in space relative to the fixed sources as viewed from the point of observation of the system. The output signals may be employed to control the alignment of the electro-optical system as well as for external purposes such as directing a vehicle into a position for intercepting the moving source.

In this connection, where the electro-optical system is being transported by a vehicle in space, the vehicle may be brought into a position in which no apparent movement is sensed between the moving object in space and the fixed reference system of radiation. When the vehicle is in this posiiton and travels in a direction maintaining the relationship in which there is no apparent movement between the object and the reference sources, the vehicle is on a collision course with respect to the object, and so long as such relationship is maintained, the vehicle may be expected to intercept the moving object. Thus, signals may be derived from an electro-optical system in accordance with the invention for controlling the flight path of a vehicle in space by sensing the condition where no apparent movement occurs between a moving object and reference sources of radiation so that under the control of signals from electro-optical systems the vehicle travels a collision course with respect to the moving object.

A better understanding of the invention may be had from a reading of the following detailed description and an inspection of the drawings, in which:

FIG. 2 is a diagrammatic illustration of an electro-optical radiation receiving system in accordance with the invention;

Figure 9A:
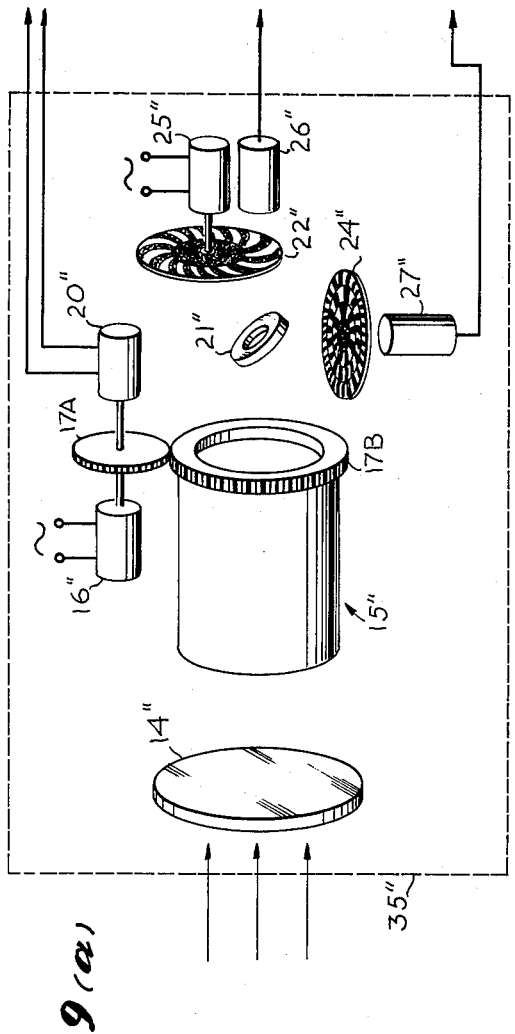
Figure 9B:
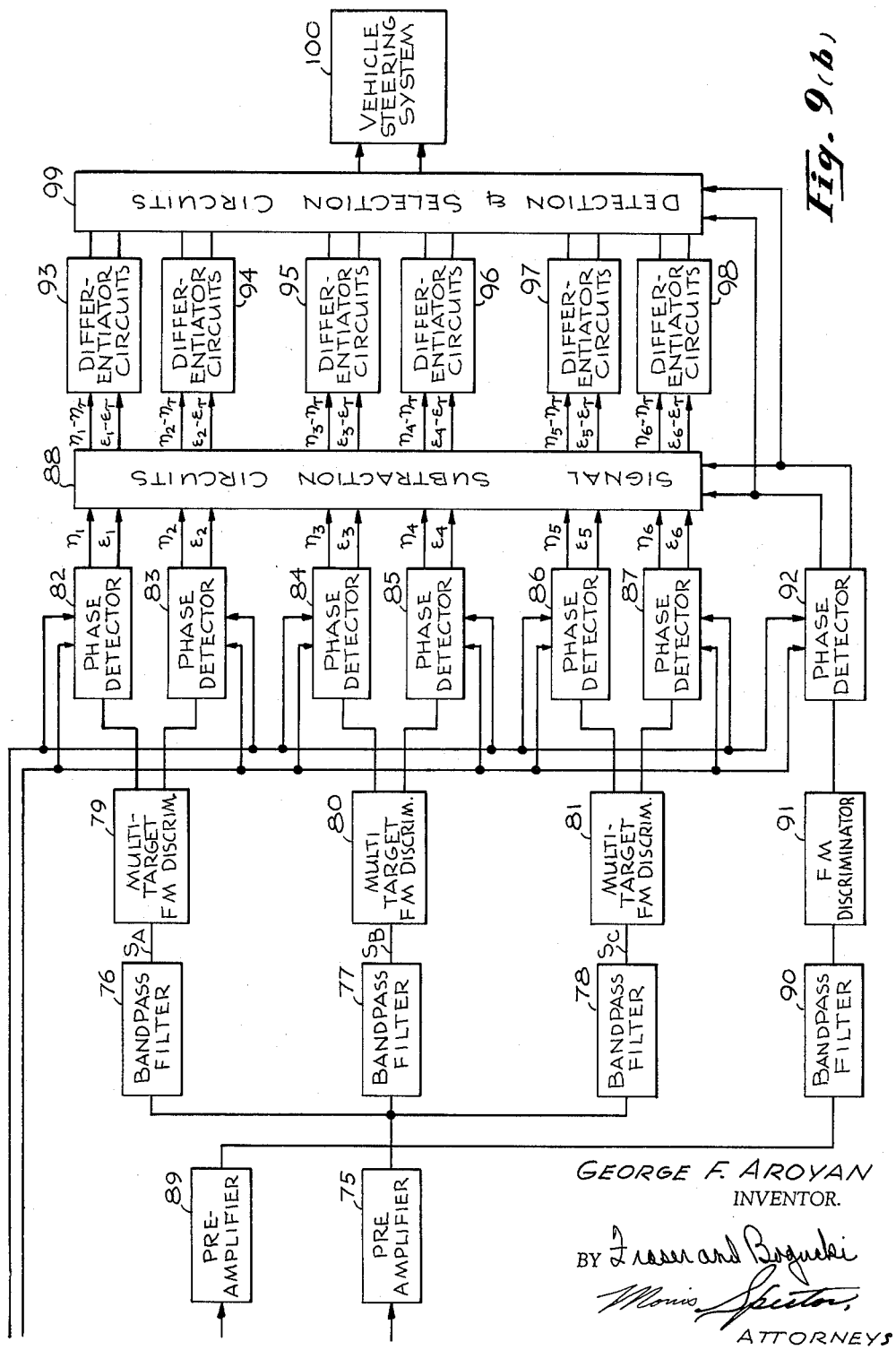
Figure 10:
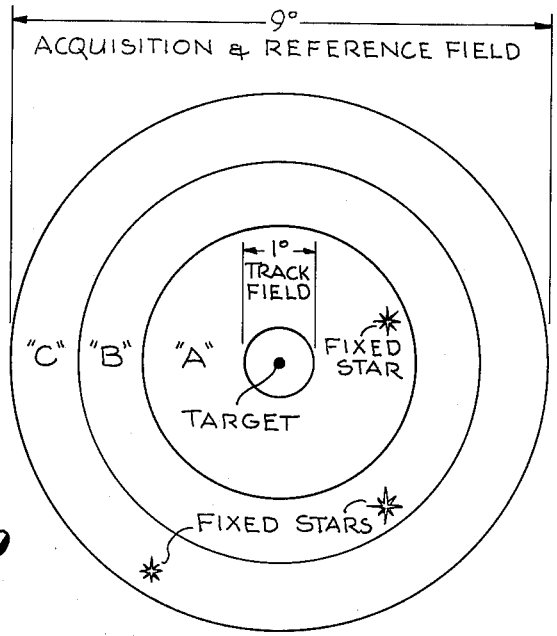
Figure 11:
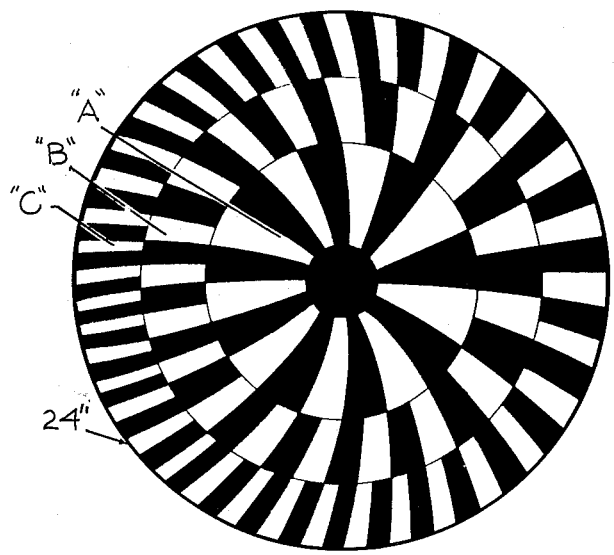

FIGS. 9(a) and 9(b) are diagrammatic illustrations of another alternative arrangement of an electro-optical radiation receiving system in accordance with the invention;

FIG. 10 is a diagrammatic illustration of the zoned field of view of the system of FIGS. 9(a) and 9(b); and FIG. 11 is a plan view of a stationary reticle for use in the system of FIGS. 9(a) and 9(b).

Figure 1:
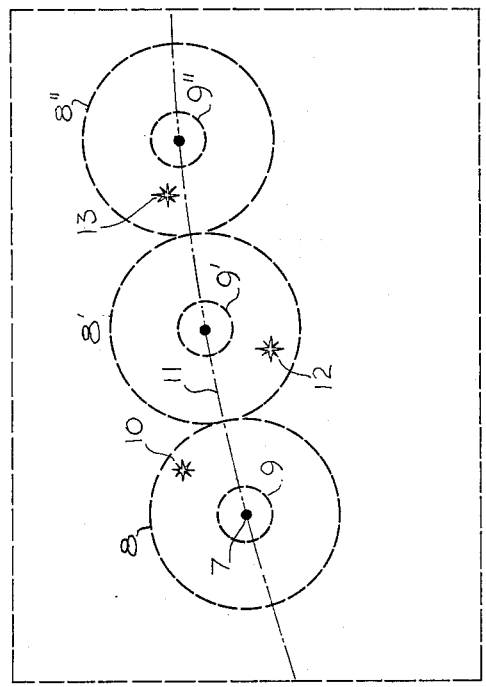
FIGURE 1 is a simplified drawing of a typical scene appearing in a volume of space in which a plurality of separate sources appear.

In FIG. 1 there is illustrated a typical scene within which radiant energy in the visible spectrum may be emitted from a selected source in the form of a target 7. The dashed circle 8 surrounding the source 7 represents the boundaries of a field of view of an electro-optical radiation receiving system in accordance with the invention. The field of view 8 is divided into two portions, as indicated by the dashed circle 9, so that a centrally disposed portion includes the selected source 7 and a peripheral portion encompasses another radiation emitting source, such as, for example, the reference star 10. Although the electro-optical radiation receiving system in accordance with the invention may be used in either a search or track mode of operation, in FIG. 1 it is assumed that a track mode of operation is functioning with the electro-optical radiation receiving system in accordance with the invention functioning to follow and maintain the source 7 aligned with the centrally disposed portion of the field of view encompassed within the dashed circle 9. Accordingly, as the source 7 travels along a path 11 in the scene of FIG. 1, the field of view of the system follows the source as indicated by the field of view defining circles 8' and 8". However, as the field of view traverses the scene, the reference star remains in fixed position. So long as the reference star 10 is within the field of view defined by the circle 8, the apparatus of the invention functions to derive electrical signals from which may be determined the coordinates and movement of the source 7 with respect to the fixed position of the reference star 10. Thus, in accordance with the apparatus of the invention to be described below, a system is provided in which the coordinates and movement in space of a selected source, such as a target, may be ascertained with respect to a fixed reference. Thus, the mechanical position of the system as a whole does not affect the determination of coordinates and movement, nor is it necessary to measure the actual direction in which the electro-optical system is pointed, as is required in conventional tracking systems, except in a gross sense sufficient to merely identify the reference object.

As the source 7 travels along the path 11 across the scene of FIG. 1, the reference star 10 may leave the field of view encompassed by the circle 8. However, by an examination of the heavens, it has been found that as a moving radiation emissive source, such as a missile or the like, travels along a path, there is at most times a suitable reference star encompassed within the peripheral field of view from which coordinate and movement determining signals may be derived. This is, of course, predicated on sufficient system sensitivity and an adequately sized field of view. Therefore, in a second position along the path 11, the field of view 8' encompasses a second reference star 12, and in a third position along the path 11, the field of view 8" encompasses a third reference star 13. Thus, in accordance with one feature of the present invention, there is provided an electro-optical system which is capable of determining the coordinates and movement of a selected radiation emitting source with respect to a reference point, such as a star. Furthermore, in accordance with another feature of the invention, during conditions in which more than one reference star appear in the peripheral field of view, individual signals may be derived representing the relationship of the selected source to each of several reference stars appearing within the field of view.

In accordance with still another feature of the present invention, the presence of a selected source of radiation within the peripheral portion of the field of view 8 may be sensed to cause the electro-optical system to move in a direction in which the system is aligned with the selected source and receives radiation therefrom within the centrally disposed portion of the field of view 9. Where individual signal generating systems are employed for radiation from the centrally disposed portion and the peripheral portion of the field of view, signal components representing sources within the peripheral portion of the field of view may be sensed to determine the presence of the selected target, the electro-optical system may be moved into a position in which the selected source appears within the centrally disposed portion of the field of view, and the mode of operation of the system may be switched so that the selected source is tracked within the centrally disposed portion of the field of view.

With the above brief description of the functional operation of a system in accordance with the invention in mind, reference is now made to the diagrammatic illustration of FIG. 2 in which electrical signals may be generated representing the coordinates of a selected source of radiation with respect to a fixed point such as a reference star.

Figure 3:
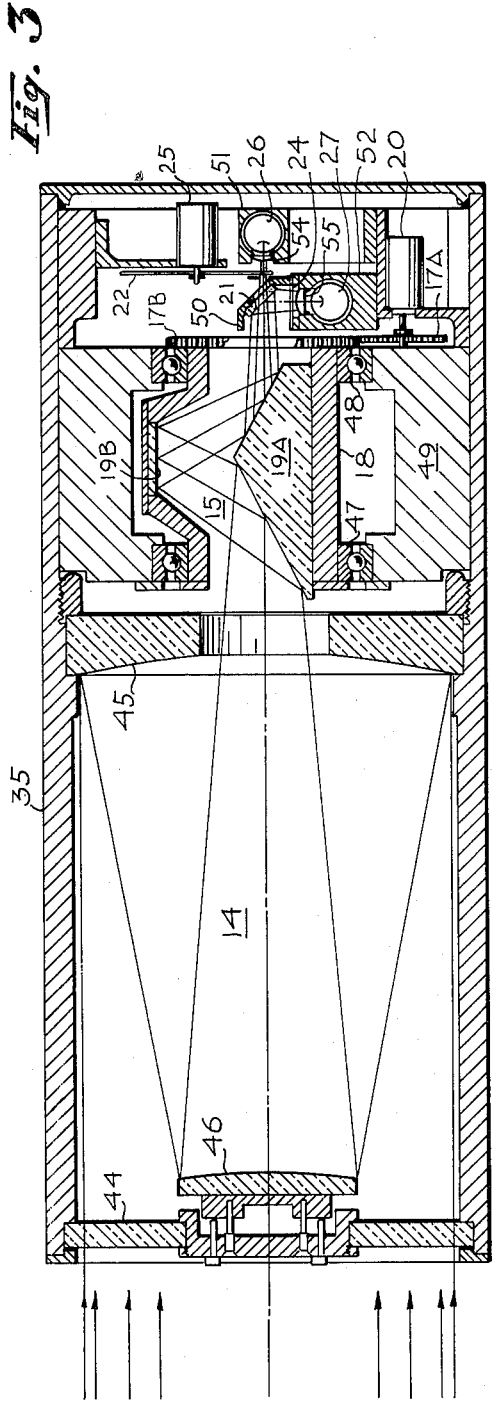
FIG. 3 is an elevational view, partially in section, of an arrangement for performing the function of the apparatus within the dashed line 35 of FIG. 2.

In the arrangement of FIG. 2, an optical system for collecting and focusing radiant energy is illustrated diagrammatically by a lens 14. However, it will be appreciated that the lens 14 may comprise either a number of separate lens elements or, in the alternative, one or more mirrors having a configuration which achieves the desired collection and imaging of the received radiant energy. A particular optical configuration for performing the function illustrated diagrammatically by the lens 14 is shown in FIG. 3 and described in detail below.

As shown in FIG. 2, radiant energy from the optical system represented by the lens 14 is passed through a "K" mirror assembly 15 which is driven from a motor 16 via a gear 17A which engages a row of gear teeth 17B arranged around the periphery of a "K" mirror housing or cylinder 18. In operation, the cylinder 18 rotates at a predetermined rotational speed and functions to translate the radiant energy passed by the lens 14 in a manner which rotates the field of view of the electro-optical system with two complete revolutions of the field of view taking place for each revolution of the cylinder 18. Within the cylinder 18 there may be mounted a prism-shaped block having reflective surfaces as indicated in phantom at 19A. Radiant energy striking the forward surface of the prism block 19A is reflected upwardly toward a mirror 19B which in turn redirects the radiant energy downwardly into engagement with the opposite face of the prism block 19A where energy is reflected to pass out of the "K" mirror assembly in a manner which effects a rotation of the field of view of the system as described above. A reference wave corresponding to the instantaneous angular position of the field of view may be derived from the "K" mirror assembly drive system by means of a small electrical signal generator or resolver 20. It will be appreciated that the frequency of the wave generated by the reference wave generator 20 driven by gear 17A which engages teeth 17B will be equal to twice the rotational speed of the cylinder 18 in order that each cycle of the alternating current reference wave corresponds to a complete rotation of the field of view.

The radiant energy passed by the "K" mirror assembly 15 is separated into two portions by means of an apertured mirror 21. Through the center of the apertured mirror 21 passes the radiant energy corresponding to the centrally disposed portion of the field of view defined by the dashed circle 9 in FIG. 1. Thus, radiant energy corresponding to the centrally disposed portion of the field of view is brought into focus at a focal plane in which is located at a rotating chopping reticle 22 which has alternate sectors 23A and 23B which are relatively opaque and transparent, respectively, to the received radiant energy. Thus, as the reticle 22 rotates, the opaque sectors 23A are swept across the field of view, thereby modulating the received radiant energy.

Received radiation falling within the peripheral portion of the field of view defined by the circle 8 of FIG. 1 is reflected by the mirror 21, and it is brought into focus at a focal plane in which is located a fixed rectile 24 which functions to chop or modulate the received radiation falling within the peripheral field of view by virtue of the fact that the "K" mirror assembly 15 rotates the entire field of view. Since the centrally disposed portion of the field of view is missing at the plane of the reticle 24, the center of the fixed reticle 24 may be positioned on the optical axis and need not be operational. By means of a specially designed reticle known as a "Karousell" type reticle, a chopping or modulation of the received radiation falling within the peripheral portion of the field of view may be achieved without the necessity for rotating the reticle 24. In contrast, the center of the reticle 22 is offset from the optical axis so that the image of the centrally disposed portion of the field of view passed by the mirror 21 is applied to an area between the center and outer edge of the reticle 22. The reticle 22 is driven by a synchronous motor 25 to effect the modulating or chopping function with respect to the radiation passed through the center of the mirror 21.

Each of the reticles 22 and 24 passes the radiation impinging thereon in a manner in which frequency modulated signals may be derived from each of the radiation sensitive cells 26 and 27 associated therewith. In the case of the cell 26, the output signal represents radiation received within the centrally disposed portion of the field of view, and in the case of the cell 27 the output signal represents received radiation falling within the peripheral field of view.

Figure 4:
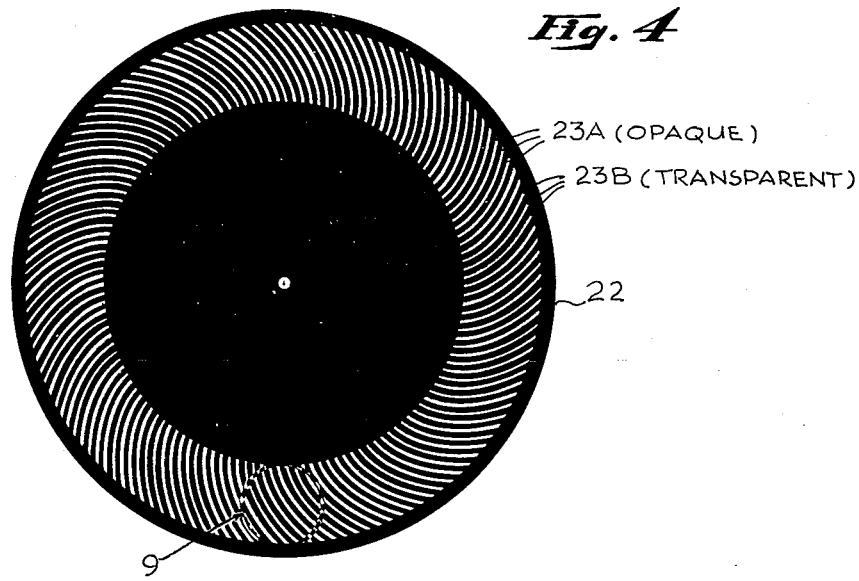
FIG. 4 is a plan view of a rotating involute track reticle for use in the arrangement of FIG. 2.
Figure 5:
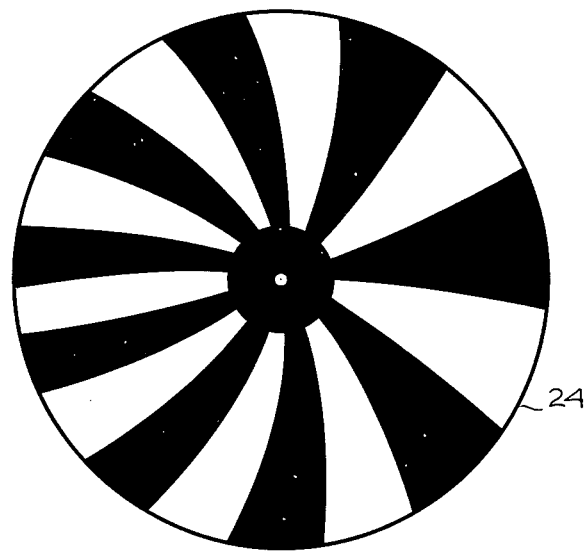
FIG. 5 is a plan view of a stationary reticle for use in the arrangement of FIG. 2.

The manner in which each of the reticles 22 and 24 functions to impart a frequency modulation component to the received energy may be best understood by reference to the plan views of FIGS. 4 and 5, in which FIG. 4 represents a suitable involute reticle for use as the offset reticle 22, and FIG. 5 represents a suitable "Karousell" type reticle for use as a fixed reticle 24.

The centrally disposed field of view is indicated in FIG. 4 by means of the dashed circle 9. Whenever a point source of radiation appears within the centrally disposed field of view and is focused in the plane of the reticle of FIG. 4, the alternate sectors 23A and 23B function to modulate or "chop" the radiation to the radiation sensitive cell 26. As a result, the radiation sensitive cell 26 of FIG. 2 generates an output signal which is modulated at the rate at which the opaque sectors of the reticle 22 traverse the point source of radiation. Assuming that a point source of radiation is within the centrally disposed field of view 9 and is aligned with the optical axis of the lens 14 and "K" mirror assembly 15 of FIG. 2, the image appearing within the field of view 9 at the reticle 22 remains in fixed position notwithstanding the rotation of the field of view by the "K" mirror assembly 15, with the result that a modulated carrier wave appears at the output of the radiation sensitive cell 26. On the other hand, if a source of radiation appears within the centrally disposed field of view 9 not along the optical axis of the lens 14 and "K" mirror assembly 15, the "K" mirror assembly 15 functions to rotate the image of the source at the reticle 22 in a circle, so that a frequency modulation component is produced in the electrical signal generated by the radiation sensitive cell 26. The deviation of the frequency modulated component from the mean carrier frequency is a function of the distance of the image of the source of radiation from the optical axis of the system at the focal plane of the reticle 22, and the phase of the frequency modulation component corresponds to the instantaneous angular position of the image with respect to the optical axis of the system. By a comparison of the frequency modulated wave with the reference wave from the generator 20, as described below, signals may be derived corresponding to the source of radiation in either cartesian or polar coordinates.

With respect to the operation of the reticle 24 of FIG. 2 in generating a frequency modulated signal corresponding to received radiation falling within the peripheral field of view, the stationary reticle of FIG. 5 may be employed whose characteristics are such that the rotation of an image of a source of illumination within the focal plane of the reticle 24 and about the axis thereof produces a frequency modulated component by virtue of an unequal spacing about the reticle of the alternate opaque and transparent sectors. An image falling within the peripheral field of view 8 traverses a circle upon the reticle 24 due to the rotation of the field of view by the "K" mirror assembly 15, and the opaque sectors effect a modulation or chopping action of the image at varying rates depending upon the angular position of the image. The result is that the radiation sensitive cell 27 produces a frequency modulated signal corresponding to received radiation falling within the peripheral field of view, with the "K" mirror assembly 15 effecting the essential rotation of the image at the reticle 24.

Where a radiation receiving system in accordance with the invention is to be employed for the purpose of determining the coordinates or position of a radiant energy emitting source in the form of a missile or the like, the radiation sensitive cells 26 and 27 may be adapted to respond to radiation falling within differing spectral bands. For example, the radiation sensitive cell 26 receiving energy within the centrally disposed field of view may be selected in its characteristics, or an auxiliary filter may be employed, such that infrared energy only produces an output signal. In similar fashion, the radiation sensitive cell 27 receiving energy from the peripheral field of view may be selected in its characteristics, or an auxiliary filter may be employed, such that visible light energy only produces an output signal. With this arrangement, the system of FIG. 2 is capable of tracking the hot exhaust gases emitted from a missile while at the same time deriving suitable electrical signals from which the coordinates of the missile may be determined with respect to a visible light source such as a reference star.

The maximum deviation of the frequency modulated wave from the mean carrier frequency corresponds to the distance of the image of the source of radiation from the optical axis of the system at the focal plane in which the reticle 24 is located. Furthermore, the instantaneous deviation of the frequency modulated wave corresponds to the angular position of the source of radiation relative to a reference position of the field of view as may be identified by the reference wave provided by the reference wave generator 20.

The electrical signal provided by the radiation sensitive cell 26 contains the necessary information for the derivation of the coordinates of a source from which radiation is received within the centrally disposed portion of the field of view with reference to the optical axis of the system, and the electrical signal provided by the radiation sensitive cell 27 contains the necessary information for determining the coordinates of a source from which radiation is received within the peripheral field of view also with reference to the optical axis of the system.

As described below, the electrical signals from the cells 26 and 27 may be employed to determine the coordinates or rate of movement of a radiation emitting source with respect to a reference source. The electrical signal from the radiation sensitive cell 26 is applied to a preamplifier 28 which increases the amplitude of the signal to a suitable level for application to a bandpass filter 29 which functions to pass substantially only the frequency modulated signal components of the signal representing the centrally disposed portion of the field of view which are in turn applied to a frequency modulation discriminator 30. In a similar fashion, the electrical signals from the radiation sensitive cell 27 may be amplified by means of a preamplifier 31 and applied to a bandpass filter 32 which functions to derive the frequency modulated components from the electrical signal corresponding to the peripheral field of view for application to a frequency modulation discriminator 33. The bandpass filters 29 and 32 should be selected to have a center frequency corresponding to the main carrier frequency of a frequency modulation component with a suitable pass band being provided on each side for the passage of the essential side bands associated therewith.

The frequency modulation discriminator 30 functions to derive an output signal representing the frequency modulation components attributable to received radiation falling within the centrally disposed field of view. Accordingly, where the optical axis of the system is aligned with a source of radiation, no frequency modulation components appear in the electrical signal from the radiation sensitive cell 26 and the frequency modulation discriminator 30 provides a substantially zero output signal.

On the other hand, where radiation is received within the centrally disposed portion of the field of view displaced from the optical axis of the system, the radiation sensitive cell provides a frequency modulated wave, and the discriminator 30 functions to produce an output signal having an amplitude corresponding to the maximum deviation of the frequency modulated signal and a phase corresponding to the instantaneous deviation of the frequency modulated signal. Therefore, the output signal from the frequency modulation discriminator 30 comprises an alternating current wave having an amplitude corresponding to the displacement of an image from the optical axis of the system at the focal plane of the reticle 22 and having a phase corresponding to the angular position of the radiation source with respect to a reference position of the rotating field of view.

By comparing the output signal from the frequency modulation discriminator 30 with the reference wave provided by the reference wave generator 20, output signals may be derived either in polar or cartesian coordinates representing the relationship between the source of radiation and the optical axis of the system. For this purpose, a phase detector 34 may be connected to the output of the frequency modulation discriminator 30. Where output signals representing the source in cartesian coordinates are desired, the phase detector 34 may comprise two separate synchronous demodulators, each of which receives both the signal from the frequency modulation discriminator and the reference wave from the generator 20. However, one of the synchronous demodulators should be driven by a reference wave which is 90° out of phase with respect to that which is applied to the other synchronous demodulator. By this means, two separate output signals may be provided representing the position of the radiation source within the centrally disposed field of view in X–Y or cartesian coordinates.

In contrast, if output signals in polar coordinates are required, the phase detector 34 may include a conventional amplitude-sensitive diode detector for providing a signal corresponding to rho, i.e., the distance of the image from the optical axis, and an electrical signal corresponding to the theta component, i.e., the angular position of the image with respect to a reference position of the field of view, may be derived by a suitable phase-sensitive circuit. One such circuit may be found illustrated at page 511 of a book entitled "Waveforms," vol. 19, of the M.I.T. Radiation Laboratory Series, published in 1949 by the McGraw-Hill Book Company of New York. As illustrated, the frequency modulated signal may be added to the reference wave, and a bi-directional output signal representing the phase difference between the frequency modulated signal and the reference wave may be derived by means of a pair of amplitude-selective diodes. Accordingly, at the output of the phase detector 34 there may be derived two separate output signals within the centrally disposed field of view with respect to the optical axis of the system in either cartesian or polar coordinates, as desired.

In a similar fashion, the frequency modulated signal provided by the cell 27 is demodulated by the frequency modulation discriminator 33 and applied to a phase detector 36 which again may be arranged to provide output signals in either cartesian or polar coordinates. Thus, the output signals from the phase detector 36 represent the coordinates of a radiation emitting source falling within the peripheral field of view of the system with respect to the optical axis.

In accordance with one aspect of the present invention incorporated in the system of FIG. 2, an acquisition or search mode of operation may be obtained in which the optical system as a whole, indicated in FIG. 2 as being enclosed within the dashed rectangle 35, is scanned across the heavens to ascertain whether or not a source of radiation is present, as, for example, a missile or the like. For this purpose, the signals appearing at the output of the phase detector 36 corresponding to the peripheral field of view may be applied to a servo system 37 which moves the optical system 35 as a unit in azimuth and elevation via a mechanical linkage indicated diagrammatically by the dashed lines 38A and 38B.

The servo system 37 may include conventional servo amplifiers which function to receive an input signal and to derive a mechanical element to rebalance an input circuit to which the input signal is applied. Where the phase detector 36 provides output signals X–Y or cartesian coordinates, the servo system 37 may include two separate servo amplifiers and drive motors corresponding respectively to the azimuth and elevation of the optical system 35. Since the amplitude of the signals from the phase detector 36 corresponds to the distance of a received image in the peripheral field of view from the optical axis of the system, the servo system 37 functions to drive the optical system 35 in a direction which tends to bring the image within the centrally disposed portion of the field of view. As a result, whenever a source of radiation, hereinafter referred to as a target, is detected in the peripheral field of view, the servo system 37 functions to move the optical system in a direction which brings the image within the centrally disposed field of view so that a frequency modulated signal is generated by the cell 26 corresponding thereto. A target presence detector 39 may be connected to the output of the bandpass filter 29 for sensing the presence of a target within the centrally disposed field of view. The target presence detector 39 may comprise a simple amplitude detection circuit which senses the presence of a signal at the output of the bandpass filter 29.

An output signal from the target presence detector energizes a relay coil 40 which functions to switch a set of double-pole double-throw contacts 41 into a position in which the output of the phase detector 34 is applied to the servo system 37. Thereafter, upon the acquision of a target in the centrally disposed field of view, the signals corresponding thereto appearing at the output of the phase detector 34 are applied to the servo system 37 for the positioning of the optical system 35. The result is that the servo system 37 functions in response to the output signals from the phase detector 34 in a manner in which the optical axis of the system is substantially aligned with the target. At this point, a null balance is established in which the output signal from the discriminator 30 drops substantially to zero with the optical axis of the system being aligned with the target. As the target moves across the heavens, error signals are provided by the phase detector 34 which function to cause the system to be at all times substantially optically aligned with the target. As a result, the signals appearing at the output of the phase detector 36 represent the coordinates of whatever source appears within the peripheral field of view with respect to the target.

As described previously, with respect to FIG. 1, the peripheral field of view may be arranged to encompass at least one reference star which emanates radiation, thereby providing output signals at the output of the phase detector 36 which identify the location of the star with respect to the target. Since the star is of fixed and known location, the coordinates of the target with respect thereto may be ascertained by an interpretation of the output signals from the phase detector 36. For additional accuracy, whatever error may be present due to a misalignment of the optical axis with respect to the target may be taken into account by a combining of the output signals from the phase detectors 34 and 36. For this purpose, corresponding output signals from the phase detectors 34 and 36 corresponding to an X-axis dimension in cartesian coordinates, or a radial dimension rho in polar coordinates, may be applied to a difference circuit 42 which functions to subtract the signal provided by the phase detector 34 from the signal from the phase detector 36 in order that an output signal is provided representing the true relationship between the target and the reference source of radiation.

In a similar fashion, output signals from the phase detectors 34 and 36 corresponding to the Y-axis dimension in cartesian coordinates, or the angular position theta in polar coordinates, may be applied to another difference circuit 43 which again functions to subtract the signal from the phase detector 34 from the signal from the phase detector 36 so that an output signal is provided representing the true relationship between the reference source and the target free of the effects of misalignment of the optical axis with the target.

The output signals from the difference circuits 42 and 43 may be interpreted either automatically or manually to ascertain the coordinates of the target with respect to a selected point of observation by taking into account the coordinates of the reference source of radiation, such as a known star. Furthermore, a determination may be made as to the angular separation between the target and the reference source of radiation from the coordinate information inasmuch as the focal length of the system is known. Thus, the angular separation between the sources of radiation may also be determined with respect to the point of observation of the system without any errors being produced by mechanical inaccuracies such as those encountered in conventional systems. As noted previously in connection with FIG. 1, as the field of view sweeps across space following a target, there is at all times within the peripheral field of view a reference source of radiation from which the coordinates of the target may be ascertained. Accordingly, the system of the present invention described in FIG. 2 is not only capable of acquiring a target in the peripheral field of view and centering it in the centrally disposed field of view, but is also capable of providing output signals representing the coordinates of the target with respect to a reference source of radiation, such as a star.

Figure 6:
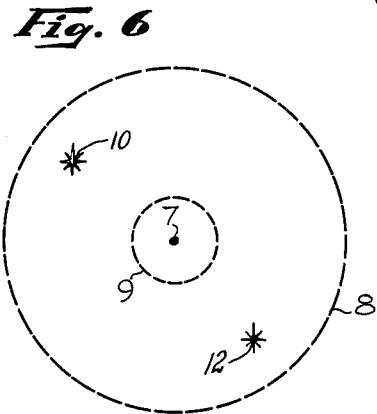
FIG. 6 is a diagrammatic illustration of the field of view of the apparatus of FIG. 2 encompassing a target and two reference sources of radiation.

In FIG. 6 there is illustrated a simplified drawing of a field of view in which a target 7 is aligned within a centrally disposed portion defined by the dashed circle 9 of a field of view 8 of the system of FIG. 2. Within the peripheral field of view, there appear two separate reference sources of radiation 10 and 12. Although it might be assumed that the arrangement of FIG. 2 would be incapable of distinguishing between the two separate reference sources of radiation 10 and 12, such is not the case. The frequency modulation discriminator 33 functions to reject the reference source of radiation of lesser intensity and to provide an output signal corresponding to substantially only the reference source of highest intensity. This phenomenon is known as the "capture" effect and appears as a result of the capability of a frequency modulation discriminator in distinguishing between two interfering frequency modulation signals. Accordingly, as the field of view scans across the heavens, there will be at all times provided at the output of the phase detector 36 signals representing one only of the reference sources of radiation appearing within the peripheral field of view. In order to enhance the "capture" effect, in a preferred embodiment, the frequency modulation discriminators 30 and 33 may comprise the type of circuit known as a phase-lock discriminator. For a detailed description of the manner in which the frequency modulation "capture" effect may be employed to advantage in deriving output signal information representing more than one source of radiation appearing within a field of view, reference is made to the description set forth below in connection with FIGS. 7 and 8.

FIG. 3 is a sectional view of an arrangement in accordance with the invention corresponding to the portion of the apparatus of FIG. 2 contained within the dashed line 35. The same reference characters have been employed in FIGS. 2 and 3 to designate similar parts, with the reference character 35 in FIG. 3 designating the case in which the optical system is housed. In FIG. 3 an optical system is provided in which received radiation passes through a circular window 44 at the left-hand end of the case 35 and impinges upon a primary parabolic mirror 45 mounted in the center of the case 35. The primary mirror 45 reflects the received radiation onto a secondary mirror 46 mounted in the center of the circular window 44. The secondary mirror 46 taken in conjunction with the primary mirror 45 performs the function of the lens 14 of FIG. 2. The secondary mirror 46 in turn reflects the received radiation into the "K" mirror assembly 15 which comprises a cylinder or rotating drum 18 within which is mounted a prism 19A, the surfaces of which are coated with a reflective coating. The drum 18 rotates on bearings 47 and 48 supported by a "K" mirror housing 49 fixed to the case 35.

The forward reflective surface of the prism 19A in FIG. 3 directs the received radiation upwardly into contact with a roof mirror 19B fastened to the drum 18 above the prism 19A, which in turn redirects the received radiation downwardly into engagement with the rear face of the prism 19A, from which the radiation is reflected out of the "K" mirror assembly 15. The drum 18 is driven by a drive motor 16 (omitted from FIG. 3 for clarity) as shown in FIG. 2. As the "K" mirror assembly 15 rotates, the field of view of the optical system rotates about the optical axis at a rate which is twice the rotational speed of the drum 18. Accordingly, a resolver or reference wave generator 20 may be linked to the drum 18 by the gears 17A and 17B for deriving a reference wave of twice the frequency of rotation of the drum 18. Thus, the instantaneous phase of the reference wave corresponds to the instantaneous position of the field of view. The radiation passing out of the "K" mirror assembly 15 engages a fixed apertured mirror 21 suspended from a bracket 50. The mirror 21 separates the centrally disposed portion of the field of view from the peripheral portion. The centrally disposed portion of the field of view passes through the aperture of the mirror 21 into engagement with a radiation sensitive cell 26 mounted in a shield block 51 via a field lens 54 supported by the block 51. The field lens 54 functions to gather the radiation for application to the cell 26.

In similar fashion, the apertured mirror 21 reflects the radiation corresponding to the peripheral field of view into engagement with a radiation sensitive cell 27 mounted in a shield block 52 via a field lens 55. Between the mirror 21 and the radiation sensitive cell 26 there is disposed in the focal plane the reticle 22 which is described in detail in connection with FIG. 2 and shown in FIG. 4. The reticle 22 is driven by the reticle drive motor 25. Disposed between the mirror 21 and the cell 27 is the stationary reticle 24 which is supported above the field lens 55. The reticle 24 is described in detail in connection with FIG. 2 and shown in FIG. 5. From the radiation sensitive cells 26 and 27 are derived electrical signals for application to the preamplifiers 28 and 31 of FIG. 2.

As noted previously, where more than one source of radiation appears within a given field of view, a composite frequency modulated signal may be generated representing each of the several sources of radiation. Due to the "capture" effect of the frequency modulation discriminator, the effects of such secondary sources of radiation do not significantly disturb the operation of the arrangement of FIG. 2, and only the stronger signals are tracked. However, for certain purposes it may be desirable to derive separate signals corresponding to each of several sources of radiation falling within a given field of view. For this purpose, the multiple frequency modulation signal discriminator of FIG. 7 may be employed by means of which several separate signals corresponding to each of the individual frequency modulation components of a composite frequency modulated wave may be derived.

Figure 7:
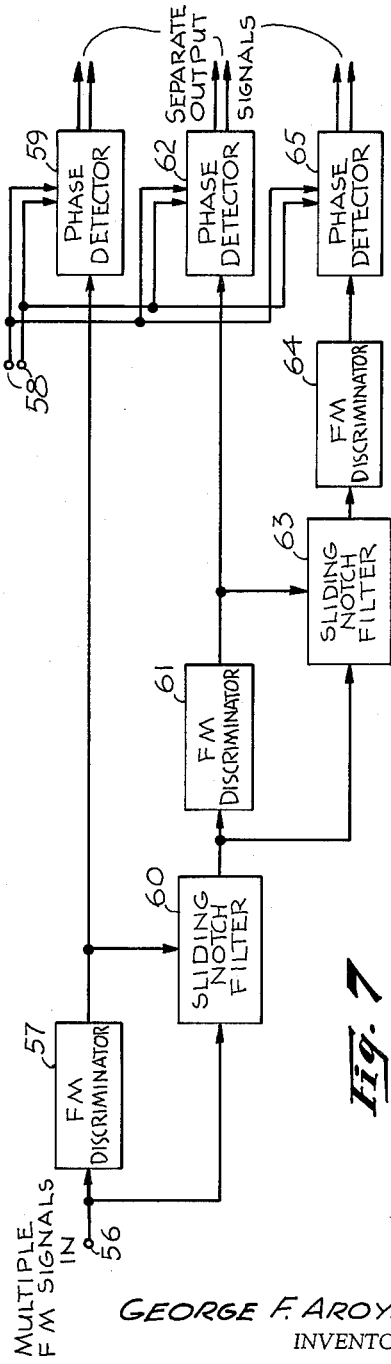
FIG. 7 is a block diagram of a frequency modulation discriminator for deriving a plurality of separate signals from a composite frequency modulated wave.

In FIG. 7, a composite frequency modulated wave may be applied to an input terminal 56, from which the signal is applied to a first frequency modulation discriminator 57 which functions to derive from the composite signal an output signal representing the frequency modulation component of the composite signal of greatest amplitude which, in an electro-optical receiving system in accordance with FIG. 2, corresponds to a radiation source of highest intensity. Reference wave signals for comparison with the output signal from the frequency modulation discriminator 57 may be applied to the terminal 58, and a phase detector 59 may be employed in a manner similar to that described above in connection with FIG. 2 for deriving the output signals corresponding to the position of the radiation-sensitive source of greatest intensity. In addition, the output signal of the frequency modulation discriminator 57 may be applied to a sliding notch filter 60 which also receives signals from the terminal 56.

The sliding notch filter 60 may comprise a conventional filter having a relatively narrow pass band, with a reactance tube or the like being connected within the filter circuit in order that the rejection frequency of the filter may be varied.

In operation, the sliding notch filter 60 functions to obliterate from the composite frequency modulated signal the components corresponding to the signal output of the frequency modulation discriminator 57. Accordingly, the output signal from the sliding notch filter 60 represents signal components of lesser amplitude or radiation intensity within the composite frequency modulated wave. By application of the output signal from the sliding notch filter 60 to a second frequency modulation discriminator 61, an output signal may be derived representing the frequency modulation components of second to highest amplitude or radiation intensity. Accordingly, by applying the output signal from the frequency modulation discriminator 61 to a second phase detector 62, which receives a reference wave from the terminal 58, output signals may be derived representing the position of a reference source of radiation of secondary intensity.

In a similar fashion, the output from the frequency modulation discriminator 61 may be applied to another sliding notch filter 63 which functions to remove the secondary frequency modulation components from the output signal from the sliding notch filter 60, so that at the output of the sliding notch filter 63 there appears a signal from which the primary and secondary frequency modulated components have been removed.

A third frequency modulation discriminator 64 functions to derive an output signal representing tertiary frequency modulation components of the composite signal which may be applied to a phase detector 65 for comparison with the reference signals applied to the terminal 58 in order that positional output signals may be derived representing a tertiary source of radiation. Thus, the apparatus of FIG. 7 functions to provide separate output signals corresponding to each of several sources of radiation falling within the field of view of the arrangement of FIG. 2. Therefore, the coordinates of a target may be established with reference to each of several fixed sources of radiation, or, as described in detail below in connection with FIG. 8, a system may be derived employing a single reticle and radiation-sensitive cell for ascertaining the coordinates of a target with respect to one or more sources of radiation of fixed location.

Figure 8:
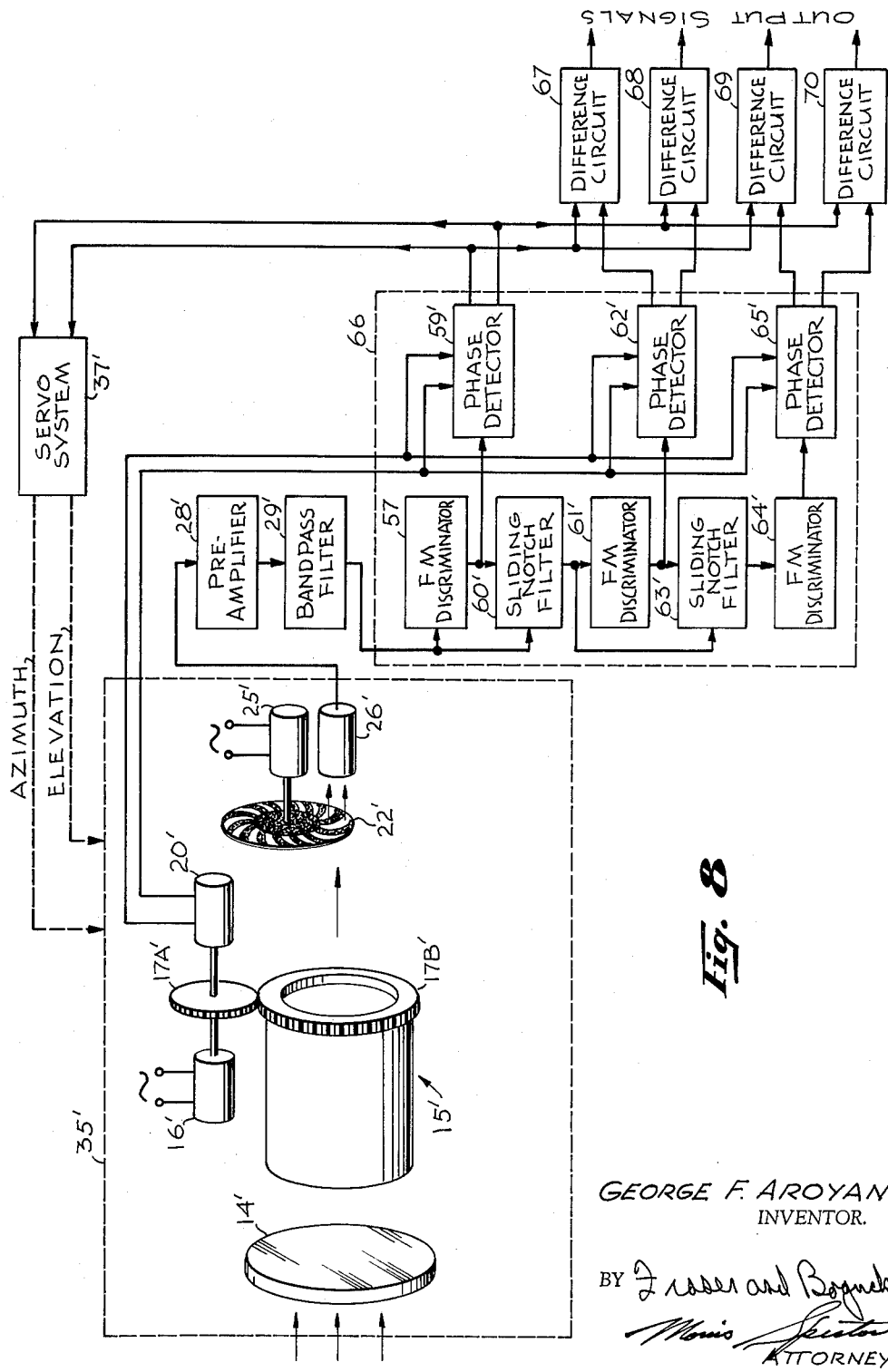
FIG. 8 is a diagrammatic illustration of one alternative embodiment of a radiation receiving system in accordance with the invention in which signals are derived representing received radiation from a plurality of separate radiation emitting sources by means of an arrangement similar to that shown in FIG. 7 for deriving separate signals from a composite frequency modulated wave.

In the arrangement of FIG. 8, an electro-optical radiation receiving system is shown in which radiation is collected by an optical system including a "K" mirror assembly substantially similar to that described above and shown in FIGS. 2 and 4, except that the system of FIG. 8 is a single channel arrangement in which received radiation falling within the entire field of view of the apparatus is applied to a single radiation sensitive cell. Accordingly, the apparatus enclosed within the dashed rectangle 35' may be identical to that shown in FIG. 4, except that the mirror 53, the stationary reticle 55, and the radiation-sensitive cell 27 may be omitted. No further description of the apparatus contained within the block 35' is believed to be necessary, it being considered sufficient to state that each of the parts of the apparatus corresponding to that shown and described in connection with FIGS. 2 and 4 is labeled with the same reference character with a prime mark (') added.

The radiation-sensitive cell 26' provides a composite output signal representing frequency modulation components produced by all of the radiation sensitive cells falling within the field of view of the apparatus. The composite frequency modulated signal from the radiation-sensitive cell 26' is applied to a preamplifier 28' and a bandpass filter 29' corresponding to like parts of the system of FIG. 2 and performing a similar function. The composite output signal from the bandpass filter 29' is applied to a multiple-target frequency modulation discriminator 66 which may be identical to that described above in connection with FIG. 7. The multiple-target frequency modulation discriminator 66 functions to provide a first pair of output signals from the phase detector 59' corresponding to received radiation from a source of greatest intensity, a pair of output signals from the phase detector 62' corresponding to received radiation from a source of secondary intensity, and a pair of output signals from the phase detector 65', corresponding to received radiation from a source of tertiary intensity.

The output signals from the phase detector 59' representing the radiation of source of greatest intensity may be applied to a servo system 37' which may be mechanically linked to the electro-optical system 35' to position the system in azimuth and elevation, as described above in connection with FIG. 2. The servo system 37' functions in response to the output signals from the phase detector 59' to bring the optical system 35' into alignment with the radiation emitting source within the field of view of greatest intensity. Upon alignment of the optical system, the output signals from the phase detector 62' represent the coordinate relationship between the primary source, i.e. target, and a secondary source of radiation, which may be a reference source such as a star, and the output signals from the phase detector 65' represent the relationship between the coordinates of the primary source and a reference source of tertiary intensity. As in FIG. 2, the output signals from the phase detectors 62' and 65' may be combined with the output signals from the phase detector 59' to take into account error signals arising from misalignment of the optical system with the primary source of radiation.

For this purpose, a first pair of difference circuits 67 and 68 receive signals from the phase detector 59' and the phase detector 62' and provide output signals representing the relationship between the primary and secondary sources of radiation substantially free of errors attributable to misalignment of the system. In a similar fashion, a pair of difference circuits 69 and 70 receive output signals from the phase detectors 59' and 62' for the purpose of providing output signals representing the relationship between the primary and tertiary sources of radiation substantially free of errors attributable to misalignment.

Although there have been described above in connection with FIGS. 2 and 8 exemplary systems for the derivation of output signals representing the relationship between the coordinates of two or more sources of radiation, the output signals from the devices may be used for other purposes as well. For example, through suitable rate taking circuitry, the movement of a selected source or target relative to a fixed reference position corresponding to the fixed sources of radiation may be ascertained in order that a prediction may be made as to the identification of a moving target and the path of the target for interception or other purposes. In this connection, it may not be necessary to interpret the output signals to determine the coordinates of the target with respect to any fixed point other than to establish the relative movement of the target with respect thereto. From this information, a prediction can be made as to the position which the target will occupy at any given subsequent instant in time so that the interception thereof may be achieved if desired.

Furthermore, where an electro-optical radiation receiving system in accordance with the invention is carried by a vehicle for intercepting a moving object in space, the output signals may be employed to cause the vehicle to follow a collision course. Such a course is established when the vehicle is brought into a path in which relative movement between the moving object in space and the reference sources of radiation ceases. Therefore, the output signals may be employed to control the flight path of the vehicle to establish a collision course.

FIGS. 9(a) and 9(b) are illustrations of an electro-optical system in accordance with the invention which is adapted to be transported by a vehicle in space and in which electrical signals corresponding to received radiation are processed to identify a moving source of radiation and to cause a vehicle bearing the electro-optical system to pursue a collision course to interrupt the moving source. Within the dashed rectangle 35" there may be included an optical system corresponding to that described above in connection with FIG. 2, differing only in the construction of the stationary recticle for modulating the radiation received from the peripheral field of view. In order to distinguish the component parts of the system of FIGS. 9(a) and 9(b) from those of the systems of FIGS. 2 and 8 described above, a double prime mark (") has been added to each reference character designating a part having a similar function to that described previously. Thus, light received by a lens 14" passes through a "K" mirror assembly 15" which rotates to effect a rotation of the field of view. An apertured mirror 21" passes received radiation from the centrally disposed portion of the field of view to a radiation-sensitive cell 26" via a reticle 22" driven by a motor 25". The "K" mirror assembly 15" is driven by a motor 16" with a reference wave generator or resolver 20" being adapted to provide output signals corresponding to the instantaneous position of the field of view.

With respect to the peripheral field of view, the apertured mirror 21" reflects the received radiation into engagement with a stationary reticle 24" having three separate concentrically disposed rings within each of which the spacing between the opaque sectors or spokes is different. Since the rotation of the field of view proceeds at a constant rate and since the number of spokes in each concentric circle differs, three separate frequency modulation signals are produced by the radiation-sensitive cell 27", each having a differing mean carrier frequency. Since the reticle 24" is in the focal plane, the peripheral field of view (FIG. 10) is divided into concentric zones corresponding to the rings of the reticle 24".

In order to effect the division of the peripheral field of view into zones as illustrated in FIG. 10, a specially designed stationary reticle is employed which is shown in FIG. 11. As shown in FIG. 11, the reticle 24" is divided into three concentric rings "A," "B," and "C," each containing different numbers of opaque sectors or spokes. Thus, radiation passing through the inner concentric ring "A" is modulated or chopped at a first given frequency, radiation passing through the second concentric ring "B" is modulated or chopped at a higher frequency due to the fact that the number of spokes contained therein is greater than in the concentric ring "A," and, similarly, radiation passing through the outer concentric ring "C" is chopped at a still higher frequency due to the fact that the outer ring "C" has more spokes than either the ring "A" or the ring "B." Furthermore, it will be noted from FIG. 11 that the spacing of the spokes in each individual ring is unequal in order that a frequency modulation component may be generated, as described previously in connection with FIG. 2. Thus, except for the division of the reticle into concentric rings, the function is similar to that of the "Karousell" type used in FIG. 2. As before, the spectral response characteristics of the cells 26" and 27" may be selected so that the generated electrical signals represent differing types of radiant energy.

Referring again to FIG. 9(b), the output signal from the cell 27", including three frequency modulation components of differing frequencies, is applied to a preamplifier 75. The output from the preamplifier 75 is applied to three separate bandpass filters 76, 77, and 78, each of which has a center frequency in its pass band corresponding to the mean carrier frequency of one of the frequency modulation components in the signal provided from the cell 27". The bandpass filter 76 may have a center frequency corresponding to the carrier frequency of the signals emanating from the concentric zone "A," the bandpass filter 77 may have a center frequency corresponding to the signals emanating from the concentric zone "B," and the bandpass filter 78 may have a center frequency corresponding to the mean carrier frequency of the frequency modulation signal corresponding to the outer concentric zone "C."

The pass bands of the bandpass filters 76, 77, and 78 may be chosen to block the passage of signal frequencies other than a selected one of the frequency modulation components so that an output signal appears at the output of each of the bandpass filters 76, 77, and 78 corresponding to radiation received in one of the concentric zones only. Thus, the peripheral field of view of the arrangement is divided into concentric zones with separate electrical signals being generated corresponding to received radiation therein.

An additional signal separation may be made in the arrangement of FIGS. 9(a) and 9(b) where more than one source of radiation appears within a given field of view, as described previously. For this purpose, multiple-target frequency modulation discriminators 79, 80, and 81 may each be arranged to receive a signal from the bandpass filters 76, 77, and 78, respectively. By means of the multiple-target frequency modulation discriminators 79–81, separate output signals may be derived corresponding to each of several radiation-emitting sources. For convenience, each of the multiple-target frequency modulation discriminators 79, 80, and 81 provides two separate output signals corresponding to a primary and a secondary source of radiation falling within its corresponding zone of the field of view. However, it will be appreciated that additional signal components representing received radiation of lesser intensity may be derived, if desired.

In the arrangement of FIGS. 9(a) and 9(b), the multiple-target frequency modulation discriminators 79–81 produce six separate output signals corresponding to a primary and a secondary source of radiation falling within each of the concentric zones of the field of view. Each of these signals is applied to a phase detector for the purpose of deriving information corresponding to the coordinates of the source of radiation. For this purpose, phase detectors 82, 83, 84, 85, 86, and 87 each receive a signal representing one source or target from one of the frequency modulation discriminators 79–81 as well as a reference wave from the reference wave generator 20″. Each of the phase detectors 82–87 functions to derive a first output signal representing the elevation (sometimes called pitch) of a radiation source with respect to the optical axis of the system and a second signal corresponding to the azimuth of the radiation source with respect to the optical axis of the system. These positional output signals are compared with the coordinates of the radiation-emitting source within the centrally disposed field of view by means of signal subtraction circuits 88.

The signals from the radiation-sensitive cell 26″ corresponding to the centrally disposed field of view are applied to a preamplifier 89, and a bandpass filter 90 functions to pass the frequency modulation components to a frequency modulation discriminator 91. A phase detector 92 compares the output of the frequency modulation discriminator 91 with the reference waves from the generator 20″, and the output signals from the phase detector 92 are applied to the signal subtraction circuits 88. As before, when the optical axis of the system is exactly aligned with a source appearing in the centrally disposed field of view, the output signal from the frequency modulation discriminator 91 is substantially equal to zero. However, in the event of any optical misalignment with the selected source, output signals are provided from the phase detector 92 representing the elevation and azimuth of the source within the centrally disposed field of view with respect to the optical axis of the system. These signals may be combined with the output signals from the phase detectors 82–87 in the signal subtraction circuits 88 to provide output signals representing the relationship between each source in the peripheral concentric zones and the source in the centrally disposed field substantially free of any error produced by misalignment.

The arrangement of FIGS. 9(a) and 9(b) is adapted to sense the condition in which radiation is received from a source which is moving relative to other sources from which radiation is received. For example, radiation may be received from fixed sources, such as stars, along with radiation from a moving object, such as a missile or satellite passing through the heavens. In order to sense the movement of a particular source, the signals from the signal subtraction circuits 88 may be applied to differentiating circuits 93, 94, 95, 96, 97, and 98 which function to derive an output signal representing the time rate of change of the signals from the signal subtraction circuits 88. So long as a particular source remains fixed within the field of view, the differentiating circuits 93–98 do not provide any output signal. However, as soon as a particular one of the signals changes its position relative to the others, an output signal is provided from the differentiating circuits 93–98 which may be applied to detector and selector circuits 99.

The detector and selector circuits 99 may include amplitude-sensitive trigger circuits which function to lock onto any signal appearing at the output of the differentiating circuits 93–98. The trigger circuits may be arranged to actuate a switch or relay so that signals representing the moving object are applied to a servo system which controls the flight path of the vehicle carrying the electro-optical radiation receiving system. When such a moving target is sensed, the output signals from the detector and selector circuits 99 may be applied to a vehicle steering system 100 to control the movement of the vehicle as, for example, right, left, up, or down.

In view of the fact that the differentiator circuits 93–98 provide output signals whenever one of the sources moves relative to another, a null balance condition is achieved only when the output signals all indicate that the received radiation is emanating from sources which are not apparently moving with respect to one another. As described previously, a collison course is established when a vehicle is aligned with a target in such a way that the target does not appear to move with respect to fixed objects in space. Therefore, the arrangement of FIGS. 9(a) and 9(b) is adapted to establish a collision course by achieving a null balance in which the target exhibits no apparent movement with respect to other objects in space. For this purpose, the detector and selector circuits 99 may include logical circuitry for identifying a condition when one and one only of the sources in space is moving relative to the others and to effect a controlled flight path of the vehicle until a collision course is established. Once such a course is established, the source will be aligned with the centrally disposed field of view, and the output signals from the phase detector 92 may be applied directly to a servo system as error signals to control the vehicle steering system 100 and to maintain the collision course.

Although the arrangement of FIGS. 9(a) and 9(b) has been described above as a system which is adapted to be carried by a flight vehicle to establish a collision course, the system may also be employed to measure the rate of movement of a moving object in space, where the system itself is mounted in either a fixed or movable position. Furthermore, a multiple-zoned reticle 24″ employed in the system of FIGS. 9(a) and 9(b) may be used as well in other systems in accordance with the invention to develop output signals corresponding to received radiation falling within separate portions of a field of view, with the separate output signals being employed for any purpose for which the invention is suitable. Since each of the illustrative embodiments is intended to be by way of example only of the manner in which the invention may be used to advantage, it will be appreciated that each of the features shown in the drawings or described above may be used alone or in combination in the practice of the invention. Accordingly, the invention should be considered to include any and all modifications, variations, or alternative arrangements falling within the scope of the annexed claims.

What is claimed is:

1. An electro-optical radiation receiving system including the combination of:

optical tracking means having a single predetermined field of view within which radiation is collected from a first radiation emitting source of unknown location and a second radiation emitting source of known location;

means responsive to that portion of the collected radiation from said optical tracking means corresponding to said first radiation emitting source for generating a first electrical signal corresponding to the coordinates of said first radiation emitting source of unknown location within said field of view;

means responsive to that portion of the collected radiation from said optical tracking means corresponding to said second radiation emitting source for generating a second electrical signal corresponding to the coordinates of said second radiation emitting source of known location within said field of view; and means coupled to said first and second electrical signal generating means for comparing said first and second electrical signals to determine the coordinates of said first radiation emitting source relative to said second radiation emitting source.

2. A radiation receiving system including the combination of:

optical tracking means having a single predetermined field of view for following a first radiation emitting source of unknown location and for collecting radiant energy from both said first radiation emitting source and a second radiation emitting source of known location all of which fall within said single predetermined field of view;

means coupled to said optical tracking means and responsive to that portion of the collected radiation from said optical tracking means corresponding to said first radiation emitting source for generating a first electrical signal corresponding to the position of said first radiation emitting source within said field of view;

means coupled to said optical tracking means and responsive to that portion of the collected radiation from said optical tracking means corresponding to said second radiation emitting source for generating a second electrical signal corresponding to the position of said second radiation emitting source within said field of view; and means coupled to said first and second electrical signal generating means for comparing said first and second electrical signals to determine the position of the first radiation emitting source relative to the second radiation emitting source.

3. An electro-optical radiation receiving system including the combination of:

electro-optical means having a single predetermined field of view for collecting radiation from at least two radiant energy emitting sources falling within said field of view;

means responsive to that portion of the radiation collected by said electro-optical means corresponding to a first radiant energy emitting source for generating a first electrical signal corresponding to the coordinates of said first radiant energy emitting source falling within a first portion of said predetermined field of view;

means responsive to that portion of the radiation collected by said electro-optical means corresponding to a second radiant energy emitting source for generating a second electrical signal corresponding to the coordinates of said second radiant energy emitting source falling within a second portion of said predetermined field of view; and means coupled to said first and second electrical signal generating means for comparing said first and second electrical signals to determine the coordinates of said first radiant energy emitting source falling within said first portion of said predetermined field of view relative to the coordinates of said second radiant energy emitting source falling within said second portion of said predetermined field of view.

4. An electro-optical radiation receiving system including the combination of:

electro-optical means having a single predetermined field of view for collecting radiation from at least two radiation emitting sources falling within said field of view;

means responsive to that portion of the radiation collected by said electro-optical means corresponding to a first radiation emitting source for generating a first electrical signal corresponding to the position of said first radiation emitting source falling within a first portion of said predetermined field of view;

means responsive to that portion of the radiation collected by said electro-optical means corresponding to a second radiation emitting source for generating a second electrical signal corresponding to the position of said second radiation emitting source falling within a second portion of said predetermined field of view; and means for comparing said first and second electrical signals to determine the relative movement of said first and second radiation emitting sources with respect to one another.

5. An electro-optical radiation receiving system including the combination of:

an optical system having a single predetermined field of view for collecting radiation emanating from at least two radiation emitting sources, said optical system including means for separating the radiation falling within a first portion of said predetermined field of view from radiation falling within a second portion of said predetermined field of view;

electro-optical means responsive to that portion of the received radiation collected by said optical system corresponding to a first radiation emitting source and falling within said first portion of said predetermined field of view for generating a first electrical signal corresponding to the coordinates of said first radiation emitting source;

electro-optical means responsive to that portion of the received radiation collected by said optical system corresponding to a second radiation emitting source and falling within said second portion of said predetermined field of view for generating a second electrical signal corresponding to the coordinates of said second radiation emitting source;

a servo system responsive to said first electrical signal for maintaining said optical system aligned with radiation received from said first radiation emitting source; and position determining means coupled to said second electrical signal generating means for providing an output signal representing the relative coordinate positions of said first radiation emitting source and said second radiation emitting source falling within said second portion of said predetermined field of view with respect to one another.

6. An electro-optical radiation receiving system for receiving radiation emitted by at least two radiation emitting sources including the combination of:

an optical radiation collecting means having a predetermined optical axis centrally located in a single predetermined field of view;

means responsive to that portion of the radiation collected by said optical means corresponding to a first radiation emitting source falling within said single predetermined field of view for generating a first electrical signal corresponding to the coordinates of said first radiation emitting source with respect to said optical axis;

servo means coupled between said first electrical signal generating means and said optical means for maintaining the optical axis of said optical means in alignment with said first radiation emitting source;

means responsive to that portion of the radiation collected by said optical means corresponding to a second radiation emitting source falling within said single predetermined field of view for generating a second electrical signal corresponding to the coordinates of said second radiation emitting source with respect to said optical axis; and means coupled to said second electrical signal generating means for providing an output signal corresponding to the relative coordinate positions of said first and second radiation emitting sources with respect to one another.

7. An electro-optical radiation receiving system for receiving radiation emitted by at least two radiation emitting sources, including the combination of:
- an optical radiation collecting means having a predetermined optical axis centrally located in a single predetermined field of view;
- means responsive to that portion of the radiation collected by said optical means corresponding to a first radiation emitting source falling within said single field of view for generating a first electrical signal corresponding to the coordinates of said first radiation emitting source with respect to said optical axis;
- servo means coupled between said first electrical signal generating means and said optical means for maintaining the optical axis of said optical means in alignment with said first radiation emitting source;
- means responsive to that portion of the radiation collected by said optical means corresponding to a second radiation emitting source falling within said single field of view for generating a second electrical signal corresponding to the coordinates of said second radiation emitting source with respect to said optical axis; and
- means coupled to said first and second electrical signal generating means for providing an output signal identifying the movement of one of said radiation emitting sources with respect to the other.

8. An electro-optical radiation receiving system including the combination of:
- optical means having a single predetermined field of view for collecting radiation emanating from at least two radiation emitting sources;
- first electrical signal generating means responsive to received radiation falling within a first portion of said predetermined field of view;
- second electrical signal generating means responsive to radiation falling within a second portion of said predetermined field of view;
- means coupled to said second electrical signal generating means for sensing the presence of a first radiation emitting source within said second portion of said predetermined field of view;
- servo means connected to said sensing means and linked to said optical means for positioning the optical means to bring said first radiation emitting source within said first portion of said predetermined field of view;
- means coupled to said second electrical signal generating means for receiving an electrical signal corresponding to a position of a second radiation emitting source falling within said second portion of said predetermined field of view; and
- means for comprising said first and second electrical signals to determine at least one coordinate of said first radiation emitting source relative to said second radiation emitting source.

9. An electro-optical radiation receiving system for receiving radiation from at least two radiation emitting sources, including the combination of:
- optical means for collecting radiation falling within two separate portions of a predetermined field of view;
- means responsive to radiation collected by said optical means for generating a first frequency modulated signal in response to the appearance of radiation from a first radiation emitting source falling within a first portion of said predetermined field of view;
- means responsive to radiation collected by said optical means for generating a second frequency modulated signal in response to radiation from a second radiation emitting source falling within a second portion of said predetermined field of view;
- a first frequency modulation discriminator coupled to said first signal generating means;
- a second frequency modulation discriminator coupled to said second signal generating means; and
- signal comparison means coupled to said first and second frequency modulation discriminators for determinating the coordinates of said first and second radiation emitting sources with respect to one another.

10. An electro-optical radiation receiving system for receiving radiation from a plurality of sources of differing intensities, including the combination of:
- optical radiation collecting means for gathering radiation emanating from a predetermined field of view encompassing said plurality of sources;
- means responsive to radiation collected by said optical means for generating an electrical signal having frequency modulation components corresponding to each of said plurality of sources;
- a first frequency modulation discriminator coupled to said electrical signal generating means for deriving an output signal corresponding to a particular one of said plurality of radiation emitting sources of greatest intensity;
- signal separation means coupled between said frequency modulation discriminator and said electrical signal generating means for deriving a second electrical signal representing said plurality of radiation emitting sources less said particular one of said radiation emitting sources of highest intensity; and
- a second frequency modulation discriminator coupled to said signal separation means for deriving an output signal representing a particular one of said radiation emitting sources of less than highest intensity.

11. An electro-optical radiation receiving system including the combination of:
- optical means for collecting radiation emanating from a predetermined field of view, said optical means including means for rotating said field of view about a fixed axis, said optical means also including means for dividing said field of view into a centrally disposed portion and a peripheral portion;
- a first reticle operable upon received radiation falling within said centrally disposed portion of the field of view;
- a first radiation sensitive cell for receiving radiation passed by said first reticle for generating an electrical signal corresponding thereto;
- a second reticle operable upon radiation falling within said peripheral portion of the field of view;
- a second radiation sensitive cell for receiving radiation passed by said second reticle and for generating an electrical signal corresponding thereto;
- a first demodulating means coupled to said first radiation sensitive cell for deriving an output signal corresponding to radiation falling within said centrally disposed portion of the field of view;
- a second demodulating means coupled to said second radiation sensitive cell for deriving an output signal corresponding to radiation falling within said peripheral portion of the field of view; and
- means coupled to said first and second demodulating means for comparing said output signals to determine the coordinates of a radiation emitting source falling within said centrally disposed portion of the field of view with respect to a radiation emitting source falling within said peripheral portion of the field of view.

12. An electro-optical radiation receiving system in accordance with claim 11 in which said second reticle is divided into separate concentric rings, each of which is adapted to modulate radiation passing therethrough at a different mean carrier frequency, and including bandpass filter means coupled to said second radiation sensitive cell for deriving separate electrical signals corresponding to the radiation passed by each of the separate rings of said second reticle, said second demodulating means being coupled to said bandpass filter means, and said second demodulating means comprising a plurality of separate demodulators for deriving a plurality of separate output signals corresponding to the radiation passed by each concentric ring of said second reticle respectively, whereby said peripheral portion of the field of view is divided into concentric zones with separate output signals being generated corresponding to radiation received in each of said zones.

13. An electro-optical radiation receiving system including the combination of:
  optical means for gathering radiation emanating from a predetermined field of view, said optical means including means for rotating said field of view with respect to a fixed axis;
  reference wave generating means linked to said field rotating means for generating a reference wave corresponding to the instantaneous position of said field of view;
  first electrical signal generating means responsive to radiation gathered by said optical means for generating a frequency modulated signal corresponding to received radiation falling within a first portion of said field of view;
  second electrical signal generating means responsive to radiation gathered by said optical means for generating an electrical signal corresponding to received radiation falling within a second portion of said predetermined field of view;
  a first frequency modulation discriminator coupled to said first electrical signal generating means;
  a second frequency modulation discriminator coupled to said second electrical signal generating means;
  a first phase detector coupled to said first frequency modulation discriminator and to said reference wave generating means for deriving a first output signal representing a comparison of the relative phases of a signal passed by said first frequency modulation discriminator and said reference wave;
  a second phase detector coupled to said second frequency modulation discriminator and to said reference wave generating means for deriving a second output signal representing a comparison of signals passed by said second frequency modulation discriminator and said reference wave; and
  signal comparison means coupled to said first and second phase detectors for generating output signals representing the coordinates of a radiation emitting source falling within said first portion of said predetermined field of view with respect to a radiation emitting source falling within the second portion of said predetermined field of view.

14. An electro-optical radiation receiving system in accordance with claim 13, in which said second electrical signal generating means comprises a reticle having separate portions adapted to modulate radiation passed thereby at differing mean carrier frequencies and a radiation sensitive cell adapted to receive radiation passed by said reticle to provide a composite electrical signal containing components corresponding to radiation received by each of the portions of the reticle, bandpass filter means corresponding to said radiation sensitive cell for separately deriving an electrical signal corresponding to the modulated radiation of each of said mean carrier frequencies, said second frequency modulation discriminator being coupled to said bandpass filter means to receive one of said electrical signals, at least one additional frequency modulation discriminator coupled to the bandpass filter means for receiving an electrical signal corresponding to modulated radiation of a mean carrier frequency differing from that received by said second frequency modulation discriminator, and an additional phase detector coupled to said additional frequency modulation discriminator and to said reference wave generating means for deriving a third output signal representing a comparison of signals passed by said additional frequency modulation discriminator and said reference wave, and said signal comparison means being coupled to said third phase detector for generating an output signal representing the coordinates of a radiation emitting source falling within said first portion of the predetermined field of view with respect to a radiation emitting source falling within said second portion of the predetermined field of view.

15. An electro-optical radiation receiving system in accordance with claim 13, including at least one other frequency modulation discriminator coupled to one of the electrical signal generating means, and at least one other phase detector coupled to said other frequency modulation discriminator means for deriving a third output signal corresponding to a secondary radiation emitting source.

16. An electro-optical radiation receiving system including the combination of:
  optical means for collecting radiation emanating from a predetermined field of view, said optical means including apparatus for dividing said field of view into a centrally positioned portion and a peripheral portion;
  means responsive to radiation collected by said optical means for generating a first electrical signal corresponding to received radiation falling within said centrally positioned portion of the field of view;
  means responsive to radiation received by said optical means for generating a second electrical signal corresponding to received radiation falling within said peripheral portion of the field of view;
  a servo system for positioning said optical means;
  selective switching means coupled between said first and second electrical signal generating means and said servo system for selectively applying signals from said first and second electrical signal generating means to said servo system to cause said optical means to be positioned to align said received radiation with said centrally positioned portion of said field of view;
  target sensing means coupled to said first electrical signal generating means;
  means coupling said target sensing means to said selective switching means whereby said signals from said first electrical signal generating means are applied to said servo system in response to received radiation falling within said centrally positioned portion of said field of view; and
  means coupled to said second electrical signal generating means for deriving an output signal representing the coordinates of a radiation emitting source within said centrally disposed portion of the field of view with respect to a reference radiation source falling within said peripheral portion of said field of view.

17. In an electro-optical radiation detection system having a single specified field of view, the combination of:
  first means for collecting radiant energy falling within said single specified field of view;
  second means optically coupled to said first means for developing electrical signals corresponding to the positions of two separate radiant energy sources falling within said single field of view; and
  means coupled to said second means selectively responsive to said electrical signals for producing output signals representing at least one coordinate of one of the separate sources of radiant energy with respect to the other of the sources of radiant energy.

18. In an electro-optical radiation detection system having a single specified field of view, the combination of:
- first means for collecting radiant energy falling within said single specified field of view;
- second means optically coupled to said first means for developing first electrical signal energy corresponding to radiation falling within a first portion of said single field of view and second electrical signal energy having spectral characteristics different from said first electrical signal energy and corresponding to radiation falling within a second portion of said single field of view; and
- means coupled to said second means and selectively responsive to the characteristics of said first and said second electrical signal energy for producing output signals representing the coordinates of the sources of radiant energy embraced by said single field of view with respect to the central axis thereof.

19. In an electro-optical radiation detection system, the combination of:
- first means for collecting radiant energy falling within a single specified field of view having a central axis, said field of view having a first portion and a second portion bearing fixed known spatial relationships with respect to the central axis of said single field of view;
- second means optically coupled to said first means for developing first electrical signal energy corresponding to the coordinates of objects embraced by said single field of view which fall within said first portion of said single field of view and second electrical signal energy having detectable characteristics different from said first electrical signal energy and representing the coordinates of objects embraced by said single field of view which fall within said second portion of said single field of view; and
- means selectively responsive to the characteristics of said first and said second signal energy for producing output signals representing the coordinate relationship between the members of a given pair of radiant energy sources, where each member of the given pair falls within a different one of said first and second portions of said single field of view.

20. In an electro-optical radiation detection system, the combination of:
- first means for collecting radiant energy falling within a single specified field of view having a first portion and a second portion;
- second means optically coupled to said first means for developing first electrical signal energy representing radiant energy sources falling within said first portion of said single field of view and second electrical signal energy having detectable characteristics different from said first electrical signal energy representing radiant energy sources falling within said second portion of said single field of view;
- third means coupled to said second means for controllably positioning said first means in response to said first electrical signal energy for maintaining a movable source of radiant energy at a substantially fixed and predetermined position within said first portion of said single field of view; and
- means responsive to the characteristics of said second electrical signal energy for developing output signals representing the coordinates of sources of radiant energy falling within said second portion of said single field of view and selected sources of radiant energy falling within said first portion of said single field of view.

21. In an electro-optical radiation detection system, the combination of:
- a unitary optical collector for collecting radiant energy falling within a single specified field of view;
- first means optically coupled to said optical collector for developing first electrical signal energy corresponding to radiation falling within a first portion of said single field of view and having a wavelength falling within a first spectral band and second electrical signal energy having characteristics different from said first electrical signal energy and corresponding to energy falling within a second portion of said single field of view and having a wavelength falling within a second spectral band different from said first spectral band; and
- means selectively responsive to the characteristics of said first and said second electrical signal energy for producing signals representing the coordinates of the individual members of pairs of radiant energy sources with respect to one another.

22. In an electro-optical radiation detection system, the combination of:
- a unitary radiant energy collector for collecting radiant energy falling within a single specified field of view;
- first means for directing said collector to a first source of radiant energy the position of which is known with respect to said collector and maintaining said source at a predetermined position within said single field of view;
- second means optically coupled to said collector for developing an electrical signal representing the coordinates of a second source of radiant energy within said single field of view relative to said predetermined position at which said first source is maintained by said first means; and
- third means responsive to said electrical signal for developing an output signal representing the coordinates of said first and second sources of radiant energy relative to said radiant energy collector.

23. In an electro-optical radiation detection system, the combination of:
- a unitary radiant energy collector for collecting radiant energy falling within a single specified field of view;
- first means optically coupled to said radiant energy collector for developing electrical signals corresponding to radiation in a first spectral band falling within a first portion of said single field of view;
- second means optically coupled to said first means for developing electrical signals corresponding to radiation in a second spectral band falling within a second portion of said single field of view, said second portion being different from said first portion; and
- means electrically coupled to said first and second means for producing electrical output signals representing the coordinates of said sources of radiant energy falling within different portions of said single field of view.

24. In an electro-optical radiation detection system, the combination of:
- first means for collecting radiant energy falling within a single specified field of view having at least a first centrally disposed portion and a second peripheral portion concentrically disposed with respect to said first portion;
- second means optically coupled to said first means for developing a first electrical signal representing radiant energy sources falling within said first portion of said single field of view and a second electrical signal representing radiant energy sources falling within said second portion of said single field of view; and
- means selectively responsive to said first and second electrical signals for producing an output signal representing the coordinate relationship between pairs of radiant energy sources, individual ones of which fall within different portions of said single field of view.

References Cited by the Examiner

UNITED STATES PATENTS

| | | |
|---|---|---|
| 2,717,735 | 9/1955 | Luck. |
| 2,919,350 | 12/1959 | Taylor et al. |
| 2,942,118 | 6/1960 | Gedance. |

OTHER REFERENCES

Pub. I: Detecting Low-Level Infrared Energy, by Dubner et al., Electronics, June 26, 1959, pages 38 to 41.

RALPH G. NILSON, *Primary Examiner.*

CHESTER L. JUSTUS, *Examiner.*

K. H. CLAFFY, W. STOLWEIN, *Assistant Examiners.*

UNITED STATES PATENT OFFICE
CERTIFICATE OF CORRECTION

Patent No. 3,239,674                      March 8, 1966

George F. Aroyan

It is certified that error appears in the above identified patent and that said Letters Patent are hereby corrected as shown below:

Column 7, line 21, cancel "at". Column 16, line 42, after "type" insert -- reticle --. Column 21, line 59, "comprising" should read -- comparing --.

Signed and sealed this 2nd day of September 1969.

(SEAL)
Attest:

Edward M. Fletcher, Jr.
Attesting Officer

WILLIAM E. SCHUYLER, JR.
Commissioner of Patents